(12) United States Patent
Mao (10) Patent No.: US 10,525,580 B2
(45) Date of Patent: Jan. 7, 2020

(54) POWER TOOL

(71) Applicant: CHERVON (HK) LIMITED, Wanchai (HK)

(72) Inventor: Guoxing Mao, Nanjing (CN)

(73) Assignee: CHEVRON (HK) LIMITED, Wanchai (HK)

( * ) Notice: Subject to any disclaimer, the term of this patent is extended or adjusted under 35 U.S.C. 154(b) by 400 days.

(21) Appl. No.: 15/378,745

(22) Filed: Dec. 14, 2016

(65) Prior Publication Data

US 2017/0182648 A1 Jun. 29, 2017

(30) Foreign Application Priority Data

Dec. 28, 2015 (CN) .................... 2015 2 1116380 U (51) Int. Cl.
*B25F 5/00* (2006.01)
*F16H 3/54* (2006.01)

(52) U.S. Cl.
CPC ............... *B25F 5/001* (2013.01); *F16H 3/54* (2013.01); *F16H 2200/2005* (2013.01); *F16H 2200/2064* (2013.01); *F16H 2200/2094* (2013.01)

(58) Field of Classification Search
CPC ...... F16H 3/66; F16H 3/54; F16H 2200/2005; F16H 2200/2064; B25F 5/001
USPC .......................................................... 173/140
See application file for complete search history.

(56) References Cited

U.S. PATENT DOCUMENTS

| 2010/0193206 A1* | 8/2010 | Teng ....................... B25B 21/02 173/48 |
| 2011/0127059 A1* | 6/2011 | Limberg ................. F16D 7/044 173/216 |
| 2014/0174775 A1* | 6/2014 | Parks ...................... B25F 5/001 173/47 |
| 2014/0296020 A1* | 10/2014 | Chen ........................ F16H 1/28 475/269 |

\* cited by examiner

Primary Examiner — Michelle Lopez
Assistant Examiner — Chinyere J Rushing-Tucker
(74) Attorney, Agent, or Firm — Greenberg Traurig, LLP (57) ABSTRACT

A power tool includes an output shaft for outputting torque, a transmission mechanism for driving the output shaft, a motor for driving the transmission mechanism, and a housing for containing the motor. The transmission mechanism includes a ring gear being capable of rotating relative to the housing, locking pins for limiting the rotation of the ring gear, a locking ring for limiting the locking pins to rotate with the ring gear, and biasing elements for biasing the locking pins so as to move toward the locking ring. The ring gear is formed with apertures going through the ring gear in an axial direction of the output shaft and the locking pins pass through the ring gear through the apertures and contact with the locking ring. The locking ring is formed with locking protuberances for contacting and engaging with the locking pins.

10 Claims, 6 Drawing Sheets

POWER TOOL

RELATED APPLICATION INFORMATION

This application claims the benefit under 35 U.S.C. § 119(a) of Chinese Patent Application No. CN 201521116380.1, filed on Dec. 28, 2015, the disclosure of which is incorporated herein by reference in its entirety.

FIELD OF THE DISCLOSURE

The present disclosure relates generally to power tools and, more particularly, to a transmission mechanism of the power tool.

BACKGROUND OF THE DISCLOSURE

Power tools, such as electric drills and electric screwdrivers, commonly include a motor, a transmission mechanism and an output shaft. The motor includes a drive shaft. The drive shaft is used to drive the transmission mechanism so as to output power to the output shaft.

When these tools are operated as hand held power tools, a user needs to grip the tool with one or two hands. If the hand held power tool has a large size, the tool is obviously not easy to operate. So, it is desired that hand held power tools not only satisfy the requirements of torque, speed and power, but also have a small size.

However, for currently known power tools, in order to obtain large output torque, the transmission mechanism commonly includes a multi-stage planet gear system and, in order to adjust the torque of the power tools, the transmission mechanism further includes an adjusting assembly. The known adjusting assemblies occupy a large space, which makes the power tools go against the miniaturization.

The statements in this section merely provide background information related to the present disclosure and may not constitute prior art.

SUMMARY

In one aspect of the disclosure, a power tool includes an output shaft for outputting torque, a transmission mechanism for driving the output shaft, a motor for driving the transmission mechanism, and a housing for containing the motor. The transmission mechanism includes a planet gear system including a ring gear being capable of rotating relative to the housing, locking pins for limiting the rotation of the ring gear, a locking ring for limiting the locking pins to rotate with the ring gear, and biasing elements for biasing the locking pins to move towards the locking ring. The planet gear system includes a sun gear driven by the motor and planet gears being capable of engaging with the sun gear and the ring gear. The ring gear is formed with apertures going through the ring gear in an axial direction of the output shaft and, the locking pins pass through the ring gear through the apertures and contact with the locking ring. The locking ring is formed with locking protuberances for contacting and engaging with the locking pins and, the locking protuberances are protruded towards the locking pins along the axial direction of the output shaft.

Further areas of applicability will become apparent from the description provided herein. It should be understood that the description and specific examples are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the invention, its application, or uses.

Figure 1:
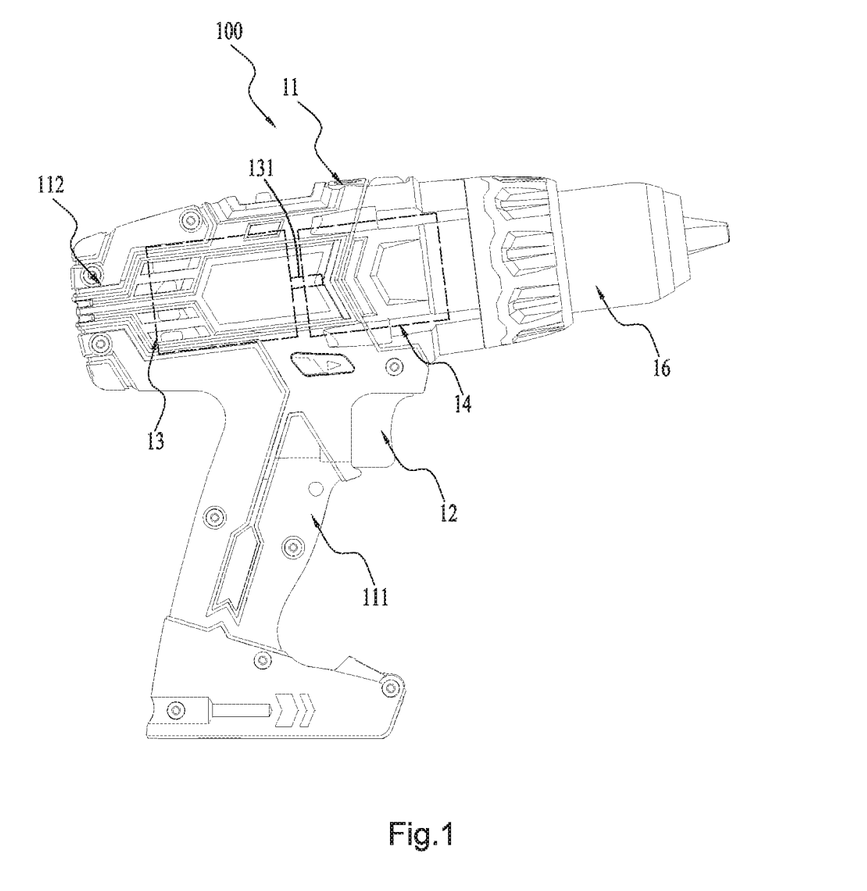
FIG. 1 is a schematic view of an exemplary power tool.

As shown in FIG. 1, a power tool 100 includes a housing 11, a switch 12, a motor 13 and a gearbox 14.

Figure 2:
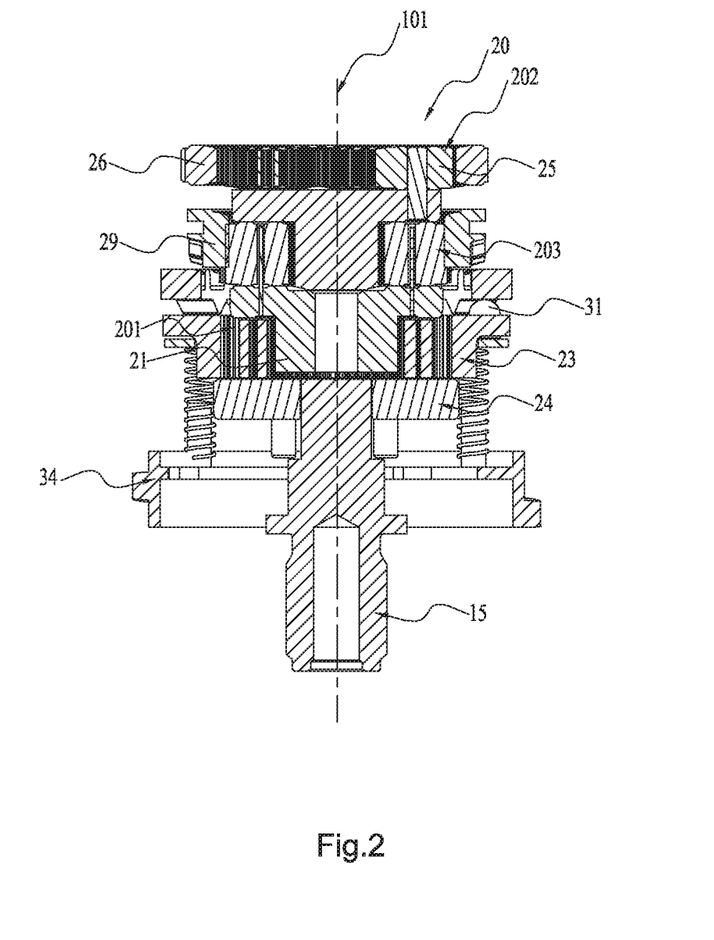
FIG. 2 a section view of an exemplary transmission mechanism and an exemplary output shaft of the power tool in FIG. 1.

As shown in FIGS. 1-2, the power tool 100 further includes an output shaft 15 and a transmission mechanism 20.

For illustrating convenience, the power tool 100 takes the form of an electric drill as an example. However, the power tool 100 may be other power tools, such as a screwdriver or a multi-function tool with the functions of the screwdriver and the electric drill. Likewise, the power tool 100 may be other tools which can convert the output torque into other movements. These tools may be used to grind a workpiece, such as a sander or an angle grinder. These tools may be used to cut the workpiece, such as a reciprocating saw, a circular saw or a jig saw. These tools may be used to impact the workpiece, such as an electric hammer. These tools may be gardening tools, such as a hedge trimmer or a chain saw. These tools may be used for other uses, such as a blender.

The embodiments described hereinafter can be adopted for use in any tool as long as these tools include the transmission mechanism 20 arranged between the motor 13 and the output shaft 15.

Referring to FIGS. 1-2, the housing 11 is configured to contain components within the power tool 100. The housing 11 includes a handle portion 111 and a containing portion 112. The handle portion 111 is used for a user to grip. The containing portion 112 is formed with a containing space for containing the components. The switch 12 is mounted on the handle portion 111.

When the user grips the handle portion 111, the user can activate the switch 12 conveniently. The switch 12 can be set as a main switch for starting the power tool 100. For the electric drill, it can include a clamping device 16 for clamping a tool bit on the power tool 100 and transfer the power to the tool bit through the clamping device 16 so as to realize the function of the power tool 100.

The motor 13 is used to convert the energy supplied by an energy source into power so as to drive the transmission mechanism 20. The motor 13 arranged in the housing 11 includes a drive shaft 131 being capable of rotating around a first axis 101. One end of the drive shaft 131 is used to transfer the power to the transmission mechanism 20.

The gearbox 14 is arranged between the motor 13 and the clamping device 16, which can be a box for containing the transmission mechanism 20.

The output shaft 15 is used to output torque, which is capable of rotating around the first axis 101.

The transmission mechanism 20 is used to drive the output shaft 15 so as to transfer power between the drive shaft 131 and the output shaft 15.

For illustrating clearly, a direction of the first axis 101 and a direction parallel to the first axis 101 are defined as an axial direction, a peripheral direction centered on the first axis 101 is defined as a circumferential direction, and the circumference centered on the first axis 101 has a radial direction.

Figure 3:
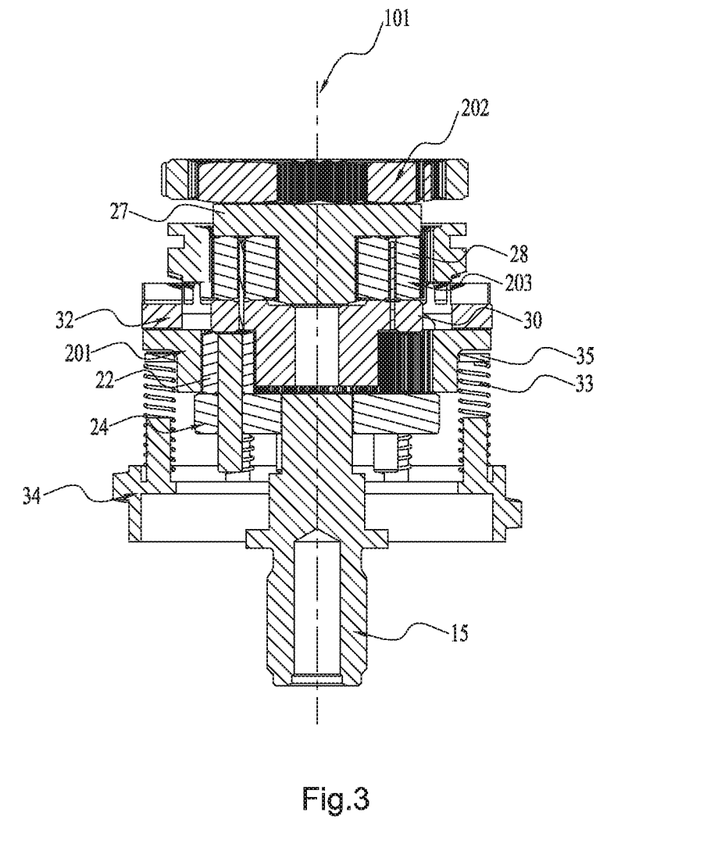
FIG. 3 is another section view of the transmission mechanism and the output shaft in FIG. 2.
Figure 4:
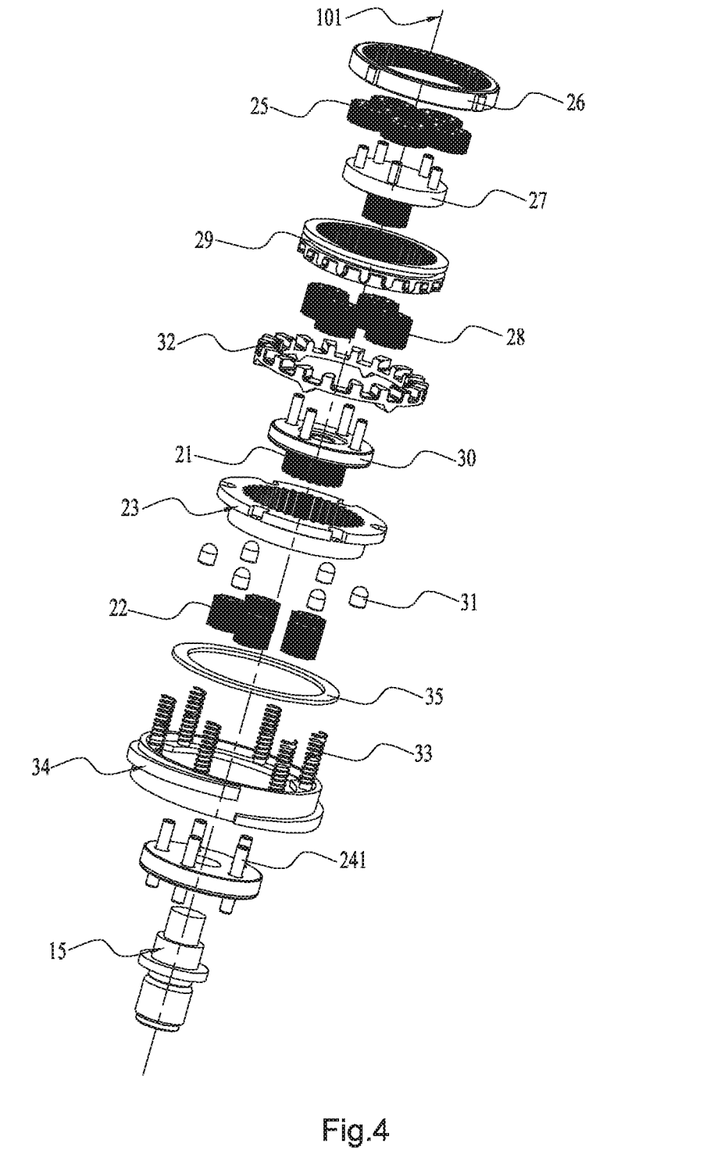
FIG. 4 is an exploded view of the transmission mechanism and the output shaft in FIG. 2.

Referring to FIGS. 2-4, the transmission mechanism 20 includes a final planet gear system 201. The final planet gear system 201 includes a sun gear 21, a planet gear 22, a ring gear 23 and a planet carrier 24. However, it is well known that the transmission mechanism 20 may include a primary planet gear system 202 and an intermediate planet gear system 203 arranged between the final planet gear system 201 and the motor 13 for reducing and adjusting speed.

For the final planet gear system 201, the sun gear 21 is driven by the motor 13. Here, the "drive" can be considered as indirect drive. The final planet gear system 201 includes a plurality of planet gears 22. The plurality of planet gears 22 surround the sun gear 21 and engage with the sun gear 21. The ring gear 23 is capable of rotating relative to the housing 11. The ring gear 23 surrounds the planet gears 22 and engages with the planet gears 22. The planet carrier 24 is formed with or fixedly connected with mounting pins 241 for rotatably mounting the planet gears 22. The planet carrier 24 is further used to output power to the output shaft 15 and capable of rotating with the output shaft 15 synchronously. That is, when one of the planet carrier 24 and the output shaft 15 is rotated, the other one can be rotated with it at the same angular speed.

The primary planet gear system 202 includes a primary planet gear 25, a primary ring gear 26 and a primary planet carrier 27. The engaging relationship among the three parts is well known and, for this reason, will not be described in detail herein.

The intermediate planet gear system 203 includes an intermediate planet gear 28, an intermediate ring gear 29 and an intermediate planet carrier 30. The engaging relationship among the three parts is well known and, as such, will not be described in detail herein. Otherwise, the intermediate planet carrier 30 is formed with or fixedly connected with the sun gear 21 on its one side close to the final planet gear system 201.

Referring to FIGS. 2-4, the transmission mechanism 20 includes locking pins 31, a locking ring 32, biasing elements 33, an adjusting element 34 and a washer 35.

Figure 5:
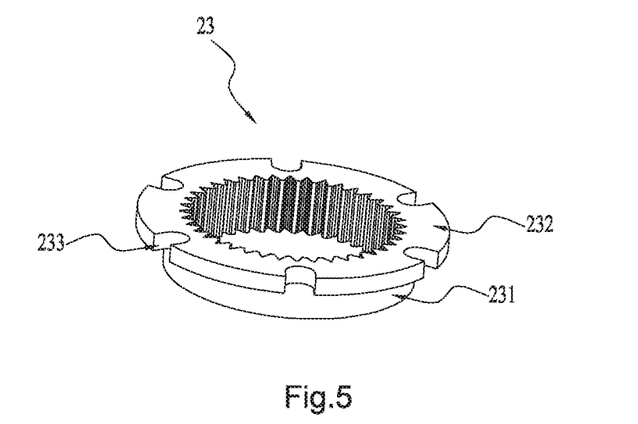
FIG. 5 is an enlarged view of a ring gear in FIG. 4.

As shown in FIG. 5, the ring gear 23 includes a body 231 and a flange 232. The body 231 has a ring shape for surrounding and containing the planet gears 22. The body 231 is formed with engaging teeth on its interior circumferential wall for engaging with the planet gears 22. The flange 232 is formed on one end of an outer circumferential wall of the body 231, which is extended from the outer circumferential wall of the body 231 along the radial direction. So, the flange 232 is protruded out of the body 231 in the radial direction. The flange 232 is formed with apertures 233 on its edge. The apertures 233 go through the ring gear 23 in the axial direction and form with gaps on the edge of the flange 232.

The locking pins 31 are used to limit the circumferential rotation of the ring gear 23, which are at least partially contained in the aperture 233. When the rotation of the locking pins 31 around the first axis 101 is locked, the circumferential rotation of the ring gear 23 is limited. At this moment, the planet carrier 24 can output power from the output shaft 15. When the rotation of the locking pins 31 around the first axis 101 is released, the circumferential rotation of the ring gear 23 is released and the ring gear 23 can rotate circumferentially. At this moment, the planet carrier 24 cannot output power from the output shaft 15.

Figure 6:
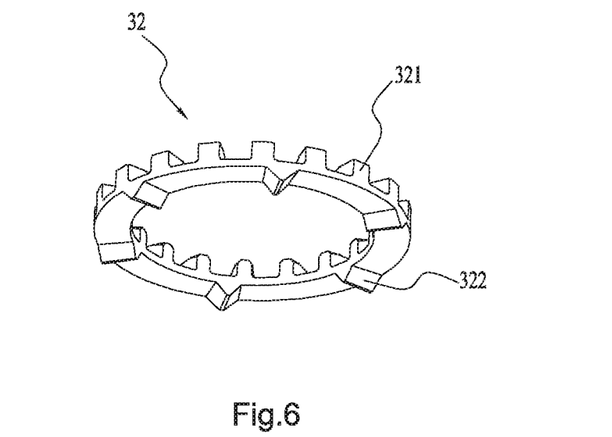
FIG. 6 is an enlarged view of a locking ring in FIG. 4.

Referring to FIGS. 4 and 6, the locking ring 32 is used to limit the locking pins 31 to rotate with the ring gear 23, which is fixedly disposed between the intermediate ring gear 29 and the ring gear 23 of the final planet gear system 201. The locking ring 32 is formed with lug bosses 321 and locking protuberances 322. The lug bosses 321 are used to engage with the intermediate ring gear 29 so as to lock and release the circumferential rotation of the intermediate ring gear 29. So, the transmission mechanism 20 has high transmission ratio and low transmission ratio, and the output shaft 15 has different speeds. The locking protuberances 322 are used to engage with the locking pins 31. The locking pins 31 go through the ring gear 23 through the apertures 233 and contact with the locking ring 32. When they contact and engage with each other, the locking pins 31 are limited to rotate with the ring gear 23 temporally. And the circumferential rotation of the ring gear 23 can be limited or released when the torque is different, so that the torque of the power tool 100 can be adjusted.

Specifically, the locking ring 32 has a ring shape. The lug bosses 321 are extended from one side of the ring shape close to the intermediate ring gear 29 toward the intermediate ring gear 29 along the axial direction. The locking protuberances 322 are extended from the other side of the ring shape close to the locking pins 31 toward the locking pins 31 along the axial direction. The lug bosses 321 and the locking protuberances 322 are formed on different axial positions of the locking ring 32.

The biasing elements 33 are used to bias the locking pins 31 to move toward the locking ring 32. The adjusting element 34 is used to adjust the biasing force of the biasing elements 33 acting on the locking pins 31. The washer 35 is used to allow the locking pins 31 to rotate relative to the biasing elements 33.

Figure 7:
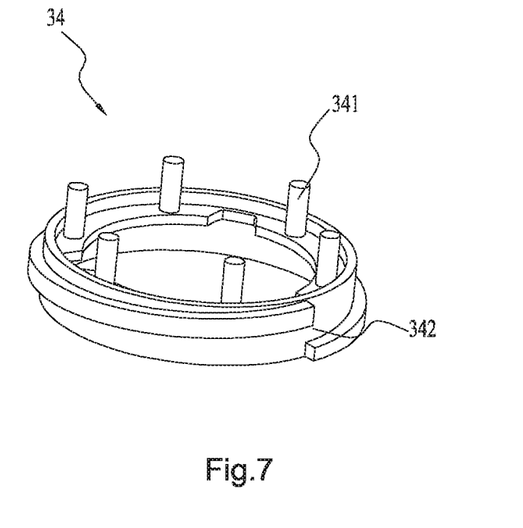
FIG. 7 is an enlarged view of an adjusting element in FIG. 4.

Referring to FIGS. 4 and 7, a plurality of locating pins 341 are extended from one end of the adjusting element 34 toward the locking pins 31 along the axial direction. The adjusting element 34 is formed with a sliding slot 342 on its periphery. The locating pins 341 can be integrated with the adjusting element 34 or separated from the adjusting element 34. The locating pins 341 are used to locate and mount the biasing elements 33. The biasing elements 33 can be coil springs around the locating pins 341 respectively. One end of the coil spring abuts on the adjusting element 34 and, the other end of the coil spring abuts on the washer 35. The sliding slot 342 with a spiral shape allows the adjusting element 34 to move with an operating button on the housing 11. Thus, when the user operates the operating button to rotate, the adjusting element 34 can slide relative to the gearbox 14 in the axial direction due to the sliding slot 342.

The washer 35 surrounds the ring gear 23. In the axial direction, the washer 35 is arranged between the locking pins 31 and the biasing elements 33. One side of the washer 35 contacts with the biasing elements 33 and, the other side of the washer 35 contacts with the locking pins 31. Thus, when the adjusting element 34 slides relative to the gearbox 14 along the axial direction, the biasing elements 33 bias the washer 35 and apply different biasing force on the washer 35. The biasing force makes the locking pins 31 move along the axial direction to a position contacting and engaging with the locking protuberances 322.

So, some parts of the transmission mechanism 20 are arranged on the shaft in the order: the locking ring 32, the locking pins 31, the ring gear 23, the washer 35, the biasing elements 33 and the adjusting element 34.

As an embodiment, each locking pin 31 includes two ends. One end of the locking pin 31 contactsing with the locking ring 32 has a spherical surface and, the other end has a flat surface for contacting with the washer 35. Correspondingly, each locking protuberance 322 of the locking ring 32 includes an inclined surface for engaging with the spherical surface. In detail, each locking protuberance 322 has a triangular prism shape. One side wall among three side walls of the triangular prism aligns with the locking ring 32 and, the other two side walls can be considered as inclined surfaces engaging with the spherical surface.

The adjusting process and principle of the transmission mechanism 20 are illustrated as follows. After the switch 12 is activated by the user, because the locking ring 32 is fixedly disposed in the housing 11, the primary planet gear system 202 and the intermediate planet gear system 203 can transfer power to the final planet gear system 201. At this moment, a rotational torque acts on the ring gear 23. With the action of the rotational torque, the ring gear 23 drives the locking pins 31 in the apertures 233 to rotate together. When the locking pins 31 are driven to rotate so as to contact with the locking protuberances 322 of the locking ring 32, the locking pins 31 are acted upon by the rotational torque and an axial force generated by the locking protuberances 322 at the same time. If the axial force acting on the locking pins 31 is not greater than the biasing force of the biasing elements 33, the locking pins 31 drive the ring gear 23 to stop rotating. So, the planet carrier 24 can output power through the output shaft 15. If the axial force acting on the locking pins 31 is greater than the biasing force of the biasing elements 33, the locking pins 31 move in the axial direction and go over the locking protuberances 322, and the locking pins 31 continue to rotate with the ring gear 23 so the planet carrier 24 cannot output power through the output shaft 15 while the biasing force of the biasing elements 33 can be adjusted by the adjusting element 34. Thus, when the user operates the operating button, the biasing force of the biasing elements 33 is adjusted by the adjusting element 34 so as to adjust the torque of the power tool 100.

The lug bosses 321 of the locking ring 32 can be used to fix the intermediate ring gear 29. The locking protuberances 322 cooperate with the ring gear 23 and the locking pins 31 so as to adjust the torque of the power tool 100. The multiple functions are integrated so as to make the transmission mechanism 20 compact. Furthermore, the ring gear 23 can be locked and released without movement in the axial direction so as to reduce the axial size of the transmission mechanism 20. Furthermore, the adjusting element 34 is engaged with the operating button on the housing 11 or with the housing 11 directly, so that the transmission mechanism 20 can carry larger torque.

The above illustrates and describes basic principles, main features and advantages of the invention hereinafter claimed. Those skilled in the art should appreciate that the above embodiments do not limit the claimed invention in any form. Technical solutions obtained by equivalent substitution or equivalent variations all fall within the scope of the claimed invention.

What is claimed is:

1. A power tool, comprising:
   an output shaft for outputting torque;
   a transmission mechanism for driving the output shaft;
   a motor for driving the transmission mechanism; and
   a housing for containing the motor,
   wherein the transmission mechanism comprises:
   a planet gear system comprising a first ring gear being capable of rotating relative to the housing;
   locking pins for limiting the rotation of the first ring gear;
   a locking ring for limiting the locking pins to rotate with the first ring gear; and
   biasing elements for biasing the locking pins so as to move toward the locking ring,
   wherein the planet gear system comprises:
   a sun gear driven by the motor; and
   planet gears being capable of engaging with the sun gear and the first ring gear;
   wherein the first ring gear is formed with apertures going through the first ring gear in an axial direction of the output shaft and the locking pins pass through the first ring gear through the apertures and contact with the locking ring,
   wherein the locking ring is formed with locking protuberances for contacting and engaging with the locking pins and the locking protuberances protrude towards the locking pins along the axial direction of the output shaft, and
   wherein the transmission mechanism further comprises a second ring gear disposed between the locking ring and the motor, the second ring gear has an inner surface and an outer surface, the inner surface is formed with inner teeth, the outer surface is formed with protrusions, the locking ring is formed with lug bosses for engaging with the protrusions so as to lock or release the circumferential rotation of the second ring gear, and the lug bosses are extended from one side of the locking ring close to the second ring gear toward the second ring gear along an axial direction.

2. The power tool of claim 1, wherein the transmission mechanism comprises an adjusting element for adjusting a biasing force of the biasing elements acting on the locking pins, the power tool further comprises a gearbox for containing the transmission mechanism, and the adjusting element is capable of moving relative to the gearbox.

3. The power tool of claim 2, wherein the adjusting element is capable of sliding relative to the gearbox and the locking pins are arranged between the adjusting element and the locking ring in the axial direction of the output shaft.

4. The power tool of claim 2, wherein the biasing elements are coil springs, the adjusting element is connected or formed with locating pins, and the coil springs are mounted on the locating pins respectively.

5. The power tool of claim 1, wherein the transmission mechanism comprises a washer being arranged between the locking pins and the biasing elements.

6. The power tool of claim 5, wherein the first ring gear is surrounded by the washer.

7. The power tool of claim 1, wherein each locking pin comprises two ends, one end of each locking pin contacting with the locking ring has a spherical surface and the other end has a flat surface.

8. The power tool of claim 1, wherein the planet gear system comprises a planet carrier for rotatably mounting the planet gears and the planet carrier is rotated with the output shaft synchronously.

9. The power tool of claim 1, wherein the first ring gear comprises a body for containing the planet gears and a flange for forming the apertures and wherein the flange is protruded out of the body in a radial direction.

10. The power tool of claim 9, wherein the apertures are arranged on an edge of the flange and formed with gaps on the edge of the flange.

* * * * *

UNITED STATES PATENT AND TRADEMARK OFFICE
CERTIFICATE OF CORRECTION

PATENT NO. : 10,525,580 B2
APPLICATION NO. : 15/378745
DATED : January 7, 2020
INVENTOR(S) : Guoxing Mao It is certified that error appears in the above-identified patent and that said Letters Patent is hereby corrected as shown below:

On the Title Page (73) Assignee: [Chevron] should be "Chervon"

Signed and Sealed this
Seventh Day of May, 2024

Katherine Kelly Vidal
*Director of the United States Patent and Trademark Office*